A. E. HOTCHKISS.
Car-Starters.

No 151,699. Patented June 9, 1874.

Witnesses
N. Davenport
A. B. Cleveland.

Inventor
Arthur E. Hotchkiss

UNITED STATES PATENT OFFICE.

ARTHUR E. HOTCHKISS, OF CHESHIRE, CONNECTICUT.

IMPROVEMENT IN CAR-STARTERS.

Specification forming part of Letters Patent No. 151,699, dated June 9, 1874; application filed October 27, 1873.

*To all whom it may concern:*

Be it known that I, ARTHUR E. HOTCHKISS, of Cheshire, in the county of New Haven and State of Connecticut, have invented certain Improvements in Car-Starters, of which the following is a full, clear, and exact description, reference being had to the accompanying drawings, which form a part of this specification.

The invention relates to an improved device for starting and moving cars upon the track.

The common method is by inserting the flat or pointed end of a pinch-bar as far as possible between the rim of the wheel and the track, and lifting and forcing the car forward; but as the force of the bar is always exerted chiefly toward the center of the wheel or axle, the wheel is rather lifted than rolled forward. The greater part of the power is, therefore, practically lost; besides, the bar is of little use when the track is icy or wet.

Sometimes a pivoted lever hooked to the axle, and working against the flange of the wheel, is used, which is superior to the pinch-bar. Still it is found that in this, and in other devices of similar character, when the lever works directly on the car-wheel, the leverage gain is insufficient unless the outer arm of the lever is inconveniently long.

The object of my invention is to obviate these difficulties, and to provide a cheap, substantial, and effective instrument for the purpose, by means of a friction-wheel, working against the flange of the car-wheel, and secured to an arm, one end of which is hooked to the car-axle, and the other end of which is connected with a small roller, which rests and rolls upon the track, the friction-wheel being operated by a lever and friction-pawl, as specifically set forth hereinafter.

Figure 1:
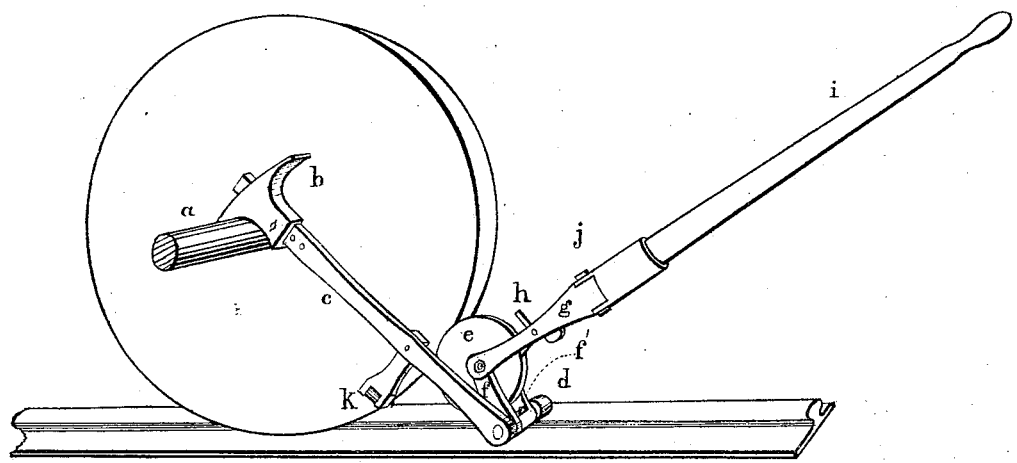
Figure 3:
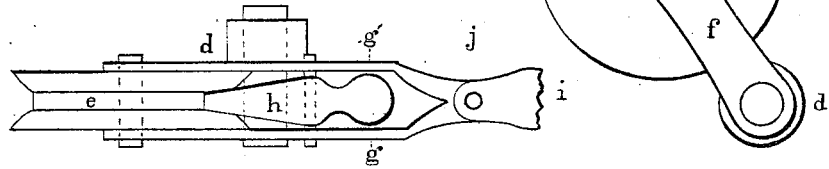
Figure 2:
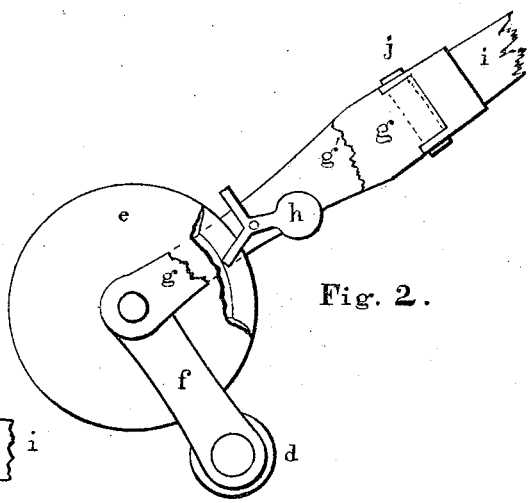

In the drawings, Figure 1 is a perspective; Fig. 2, a side elevation of a section, showing the friction-pawl; and Fig. 3, a plan of my invention.

$a$ is the axle of the car-wheel to be operated on. $b$ is a double reversible hook to fasten the device to the axle, and has a hollow shank adjustable upon the arm $c$, by means of a pin through the shank and arm, for the purpose of securing the necessary friction upon a car-wheel of any size. The other end of the arm $c$ is pivoted on the axle of the small roller $d$, which rests and rolls upon the track behind the wheel operated on. $e$ is the friction-wheel, about six to eight inches in diameter, with a rough groove to work against the flange of the wheel. The axle or hubs of this wheel $e$ rest and are carried upon two short supports, $f f'$, which are pivoted upon the shaft of the roller $d$ by the side of the arm $c$. To the hubs or axle of the friction-wheel $e$ are pivoted the lever-arms $g g'$, one upon either side, and connected to the lever-socket $j$ by a joint. Between these lever-arms is the double friction-pawl $h$, working upon a pin, and directly against the friction-wheel $e$, and weighted at the end to make it automatic, and is constructed in the proper form, and placed in a suitable position to secure upon the wheel $e$ the necessary friction to hold it when being operated upon by the lever. The lever-arms $g g'$ form a single arm at the outer end, which is jointed to the lever-socket $j$, so that the lever $i$ may be turned laterally for the purpose of working outside of the cars when used between two cars, or between the trucks of a car. $k$ is a small brace, pivoted on the arm $c$, and having a small roller on the outer end, which will rest against the side of the car-wheel and steady the machine while working. I do not regard this as absolutely necessary, as the groove in the friction-wheel will keep the machine steady; still I have shown it in the drawings as an additional means of steadying the machine. The supports $f f'$ are joined together where they rest upon the axle of the roller $d$. They have a short oscillating motion, and to prevent their moving too far forward or backward for convenience, I put a pin or stop at the proper point in the axle of the roller $d$.

It will be observed that, the hook $b$ and the friction-pawl $h$ being double, and the supports $f f'$ and the arm $c$ pivoted on the axle of the roller $d$, the device is reversible, and can be used equally well on either side of the car, or against any of its wheels.

It will also be observed that the device may be readily folded together, and made convenient for carrying about.

It is obvious that an eccentric wheel might be substituted for the friction-wheel $e$, and that the pawl might work in a ratchet, but they would be inferior to the friction-wheel and friction-pawl.

When this device is placed upon the track behind the wheel to be operated on, and the hook h attached to the axle, the friction-wheel drops readily into position against and under the car-wheel, the groove working closely against and on both sides of the flange.

When the lever i is pressed downward the friction-pawl h secures the friction-wheel e, and it is rolled backward, thereby forcing the car-wheel to revolve in the proper direction.

The machine is made of iron, except the lever i, which is made of wood.

I do not claim broadly the hook b, nor the arm c, nor the lever i; but

Having fully described my invention, what I claim is—

1. In a machine for starting or moving cars, the double reversible hook b, in combination with the arm c and roller d, as described.

2. The grooved friction-wheel e, with supports f f' and lever-arms g g', substantially as and for the purposes set forth.

3. The automatic reversible friction-pawl h, in combination with the grooved friction-wheel e of a car-starter, substantially as described.

4. The lever i, with a jointed socket, j, and lever-arms g g' of a car-starter, substantially as described and set forth herein.

Witnesses: ARTHUR E. HOTCHKISS.
N. DAVENPORT,
A. B. CLEVELAND.